(12) United States Patent
Long

(10) Patent No.: US 9,091,385 B2
(45) Date of Patent: Jul. 28, 2015

(54) PIG LAUNCHER

(71) Applicant: Nicholas Long, Swansea (GB)

(72) Inventor: Nicholas Long, Swansea (GB)

( * ) Notice: Subject to any disclaimer, the term of this patent is extended or adjusted under 35 U.S.C. 154(b) by 110 days.

(21) Appl. No.: 13/934,264

(22) Filed: Jul. 3, 2013

(65) Prior Publication Data

US 2014/0068883 A1   Mar. 13, 2014

(30) Foreign Application Priority Data

Jul. 4, 2012  (GB) .................................. 1211854.3

(51) Int. Cl.
*F16L 55/46* (2006.01)

(52) U.S. Cl.
CPC ....................... *F16L 55/46* (2013.01)

(58) Field of Classification Search
CPC ...... F16L 55/46; F16L 2101/12; B08B 9/055; B08B 2209/055
USPC ............................. 15/104.062, 3.5; 137/268
See application file for complete search history.

(56) References Cited

U.S. PATENT DOCUMENTS

| 6,022,421 | A  | * | 2/2000 | Bath et al. | .......................... 134/8 |
| 6,336,238 | B1 | * | 1/2002 | Tarlton | .............................. 15/3.5 |

* cited by examiner

*Primary Examiner* — Shay Karls

(57) ABSTRACT

As shown a carrier module (2) includes a magazine (9) having five chambers (10) each adapted to receive a pipeline pig, rotatably mounted on a blind hub (8) attached to a frame (7). A hanging eye 14 allows the module to be lowered to an undersea location where, guided by a ROV via a grab handle, its frame member (16) is received by guides (17) of a launcher module (1). The magazine passes through a large connector (4) which engages the blind hub. The ROV operates a bucket drive (22) causing the connector to engage the blind hub in sealing fashion thus enclosing the magazine in a launch chamber (3). A hydraulic ram (11) indexes the magazine to select a chamber from which a pig is to be launched or an empty chamber to receive a pig. Indexing is achieved by a roller on the free end of the ram shaft engaging in a cusped track (26) on the magazine. A pressure connection (12) for launching fluid goes through the center of the magazine, through the blind hub and back into a selected chamber.

7 Claims, 4 Drawing Sheets

PIG LAUNCHER

BENEFIT CLAIM

This application is based on, and claims the benefit of priority to, UK application GB1211854.3, filed 4 Jul. 2012.

BACKGROUND OF THE INVENTION

1. Field of the Invention

The present invention relates to pig launchers for launching pigs into (or launching pigs into and retrieving pigs from) an oil or gas production flowline and pigging systems incorporating the same. The present invention is particular applicable and is particularly described below in relation to launching pigs into (or launching pigs into and retrieving pigs from) an oil or gas subsea pipeline in a diverless operation. It will however be apparent to one skilled in the art that a launcher in accordance with the present invention could also be used for launching pigs into (or launching pigs into and retrieving pigs from) an oil or gas pipeline at a topside/surface location.

2. Description of Related Art

A remotely operated vehicle ROV is not well adapted to load or unload pipeline pigs into a pig launcher/receiver (PLR) at a subsea location. Pigging systems of the type in which one or more pipeline pigs are loaded at a surface location into one or more launching chambers of a pig launcher, the launcher is lowered to a subsea location where it is coupled to a subsea oil production pipeline and at least one pig is launched from a chamber into the pipeline are known. UK Patent Application 0132195739 A (British Petroleum); UK Patent Application GB2195740 A (British Petroleum); U.S. Pat. No. 6,533,032 B1 (Seixas et al.) and U.S. Pat. No. 6,336,238 B1 (Tarlton) disclose systems of this type.

BRIEF SUMMARY OF THE INVENTION

The object of the present invention is to provide a pig launcher divided into two modules including a launch module which can be connected to and remain connected to a pipeline at a location while a carrier module of reduced (and preferably minimal) size and complexity carries pipeline pigs to or to and from that location during pig loading and/or unloading operations.

According to a first aspect the present invention provides a pig launcher divided into two separable modules comprising a launch module and a carrier module; said launch module including at least one launch chamber having an opening through which at least one pig can be loaded into that launch chamber and a coupling arrangement arranged for coupling said launch module to a pipeline so that pigs can be launched from a said launch chamber into said pipeline; said carrier module including at least one closure member having attached thereto a corresponding housing adapted to house at least one pig, the or each said housing being positioned relative to its closure member so that, when an opening in a said launch chamber is closed by a said closure member, the corresponding said housing becomes located within that said launch chamber thus loading any pigs housed in that housing into that launch chamber. Preferably said carrier module includes a frame, said opening is a subsea connector, and said closure member is a blind hub mounted on said frame and engageable by said subsea connector. More preferably said housing is a cylindrical magazine having a plurality of holding chambers therein each adapted to hold a single pipeline pig, said magazine is rotatably mounted on the front/inner face of said blind hub and; said launch module includes ROV actuable mechanisms to rotate the magazine in indexed fashion so as to bring a selected said holding chamber into a launching position and to supply launching fluid into the said selected holding chamber so as to launch a pig therefrom into a pipeline.

Preferably said carrier module is adapted to hang underwater orientated under the effects of gravity so that a guide portion of said frame extends substantially horizontally and said launch module includes a guide arrangement adapted to receive said guide portion in docking fashion as said carrier module is moved substantially horizontally so that said blind hub is approximately aligned for engagement with said subsea connector. Even more preferably said frame includes a ROV grab handle. Preferably said subsea connector includes a guide funnel. Preferably the launch module includes a second subsea connector arranged to connect said launch module to said pipeline.

According to a second aspect the present invention provides a subsea pigging system for launching pigs into a subsea oil or gas production pipeline in a diverless operation, said system including a subsea pig launcher according to the first aspect.

BRIEF DESCRIPTION OF THE DRAWINGS

An exemplary embodiment of the present invention will now be described by way of example only with reference to the accompanying drawings in which.

DETAILED DESCRIPTION OF PREFERRED EMBODIMENTS

Figure 1:
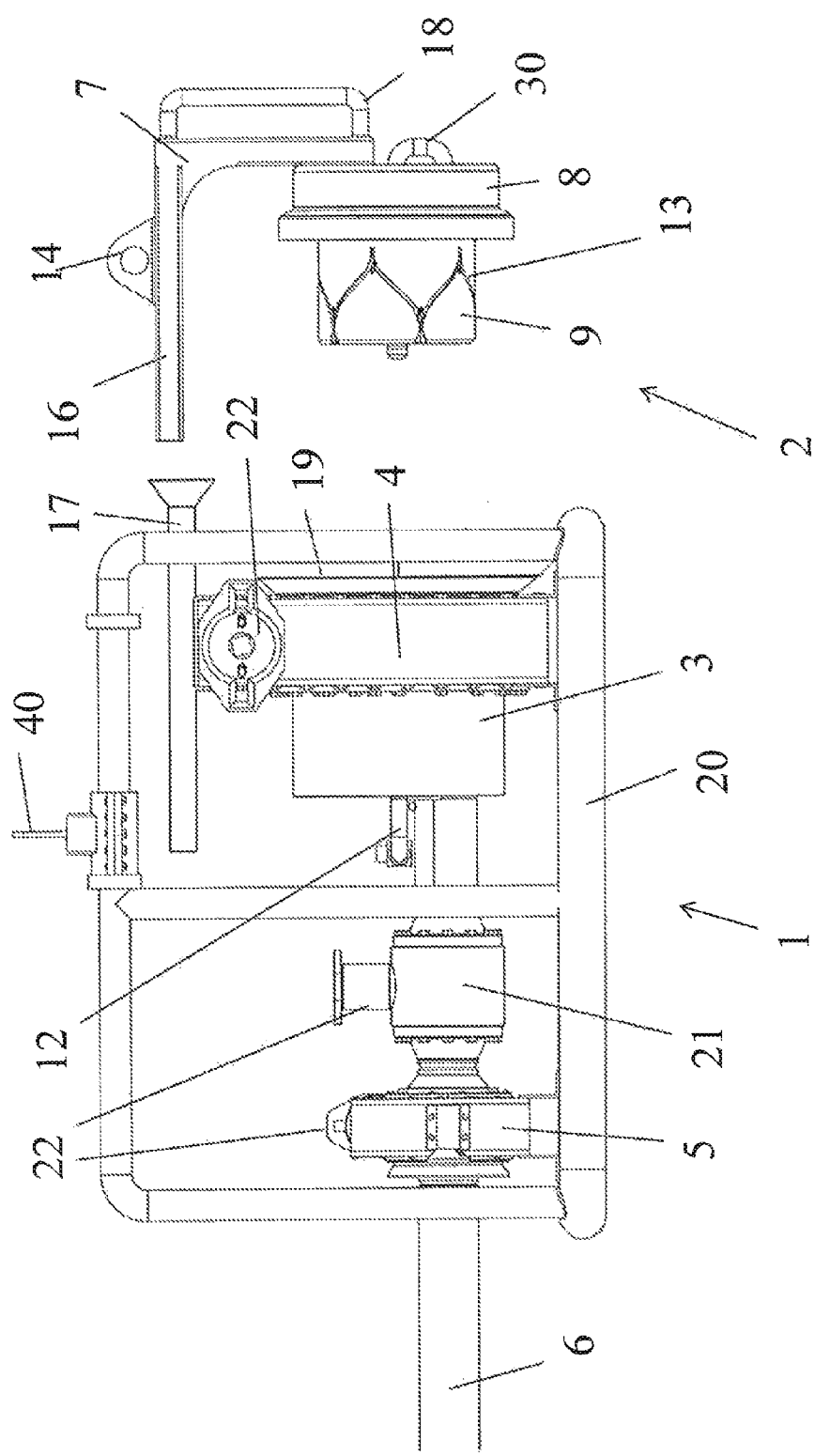
FIG. 1 is a side view of a pig launcher in accordance with the present invention separated into two modules.
Figure 2:
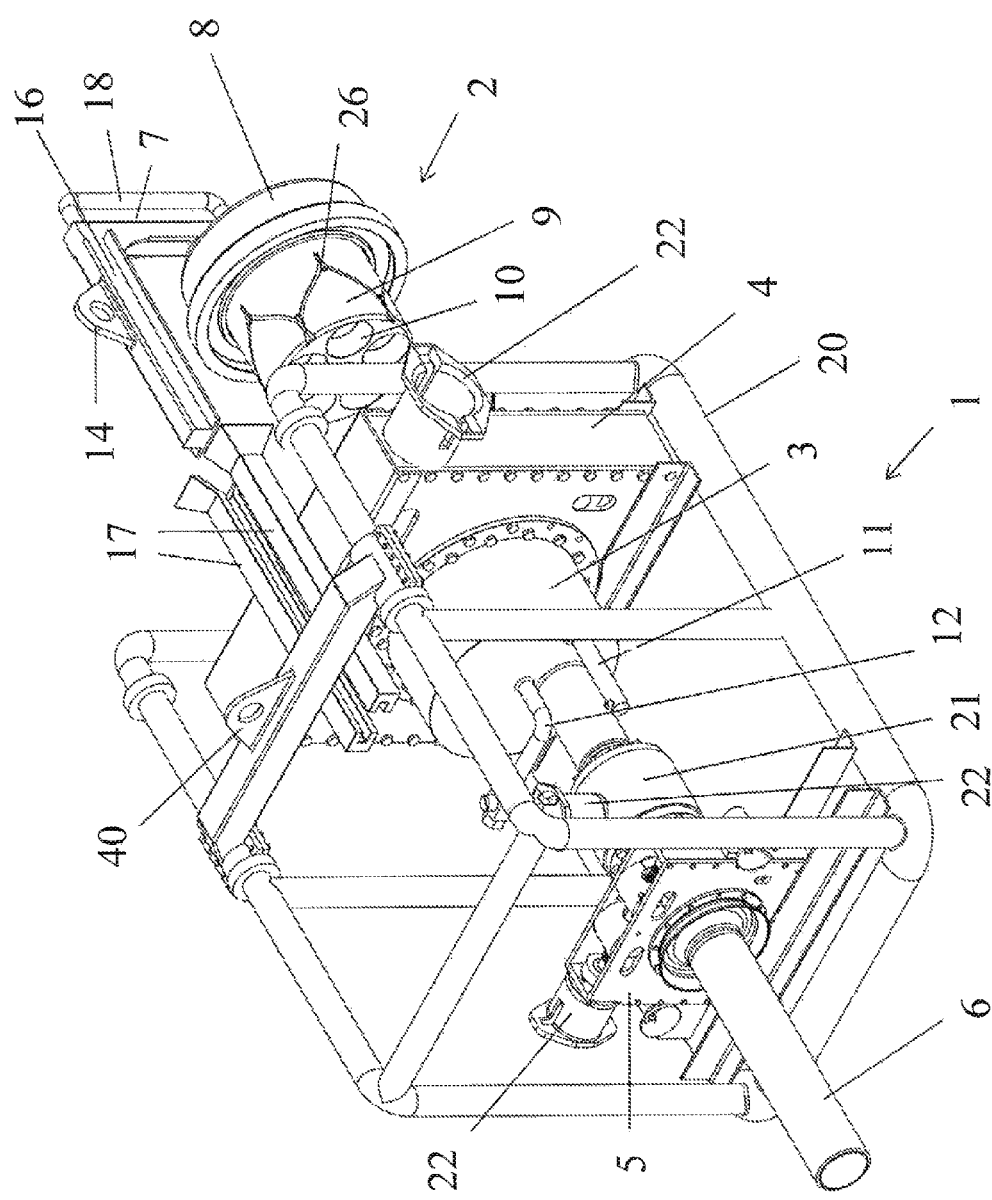
FIG. 2 is an isometric view of a pig launcher in accordance with the present invention separated into two modules.

As best shown in FIGS. 1 and 2 the pig launcher comprises a launch module 1 and a carrier module 2. The launch module which may be mounted on a sled frame 20 includes at least one launch chamber shown as a single launch chamber 3 having an opening, in the form of a first subsea connector 4, through which opening at least one pig can be loaded into the launch chamber. A coupling arrangement in the form of a second subsea connector 5 is arranged to couple the launch module to a subsea pipeline 6 so that pigs can be launched from the chamber into the pipeline. A valve 21 may be included on the sled as shown or included in the pipeline. The first and second subsea connectors and the valve are ROV actuable via drive buckets 22.

The carrier module 2 includes a hanging frame 7 on which is mounted at least one closure member shown as a single blind hub 8 engageable by the first subsea connector 4. The first and second subsea connectors each have a plurality of interconnected clamping segments and thus have a pull-in and precise alignment capability. A housing shown as a single cylindrical magazine 9 is rotatably mounted on the front/inner face of the blind hub 8. The magazine 9 is adapted to house an array of pigs one in each of a plurality of holding chambers 10. The magazine 9 is thus positioned relative to the blind hub (the closure member) so that when an opening in the launch chamber is closed by that blind hub 8 the magazine becomes located within the launch chamber. Any pigs housed in the magazine are thus loaded into the launch chamber 3.

As shown in FIG. 2 the magazine 9 has a plurality of holding chambers 10 therein. Each holding chamber is adapted to hold a single pipeline pig. The holding chambers are equally spaced around the axis of rotation of the magazine, which axis is axially aligned with the blind hub 8. The launch module includes (as will be more fully described below) a first ROV actuable mechanism 11 adapted to rotate the magazine in indexed fashion so as to bring a selected holding chamber into a launching position and a second ROV actuable mechanism 12 adapted to supply launching fluid into the selected holding chamber so as to launch a pig from that holding chamber into the pipeline 6 or to retrieve a pig from the pipeline into that holding chamber.

Figure 3:
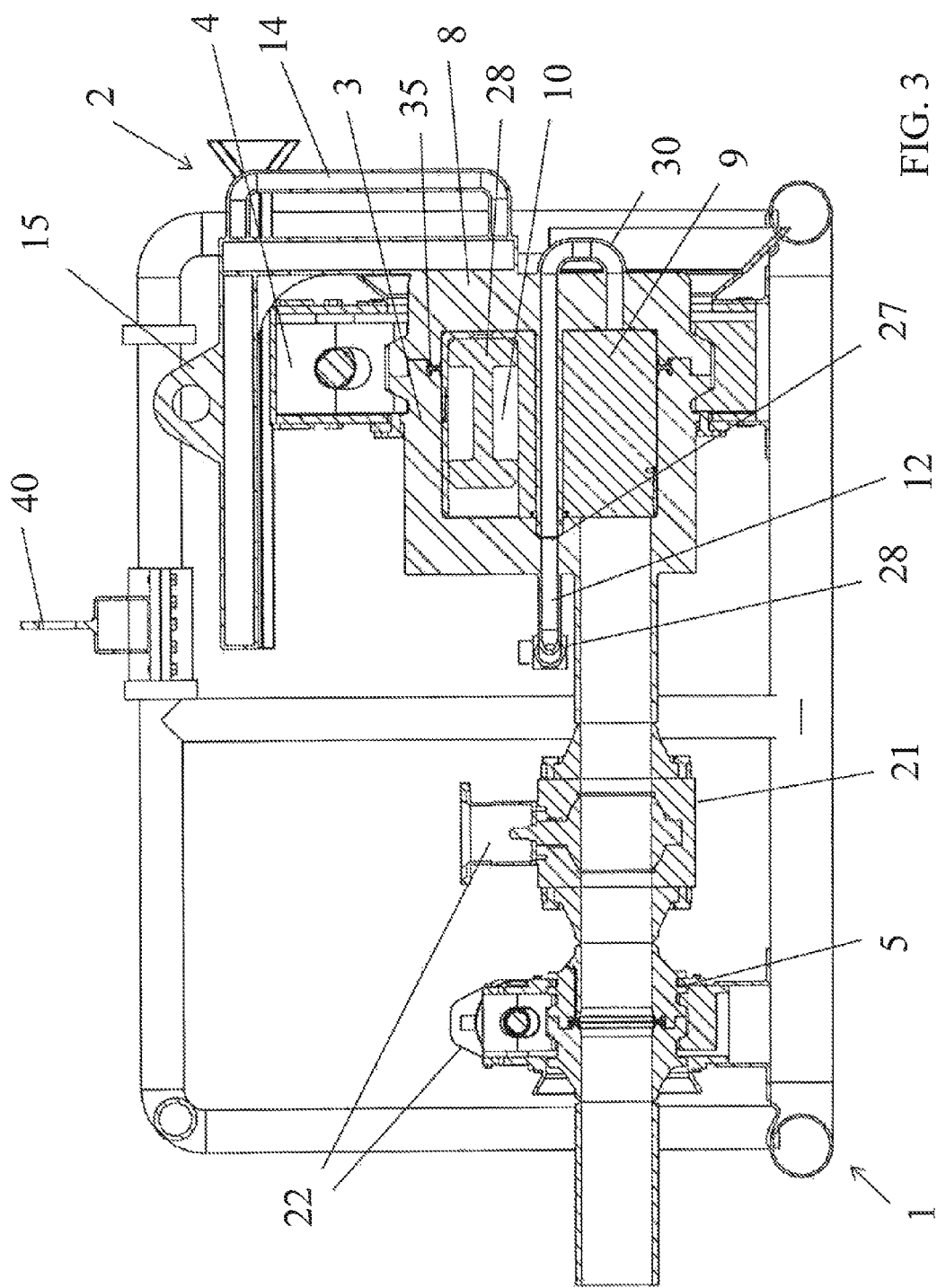
FIG. 3 is a cross sectional view through the pig launcher with the two modules connected together in docking fashion.
Figure 4:
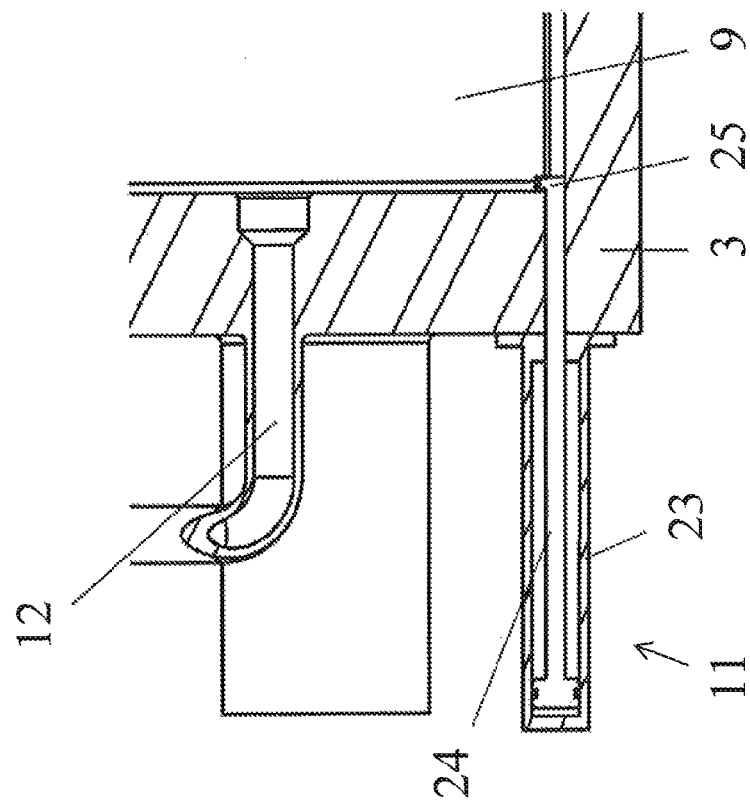
FIG. 4 shows a cross sectional detail of a channel selector.

As shown in FIGS. 2 to 4 the magazine 9 is a cylindrical body having a plurality of cylindrical holding chambers 10 therein each adapted to receive a single pipeline pig. The axes of the holding chambers are substantially parallel to and substantially equally spaced a predetermined distance from the axis of rotation of the magazine. The magazine carries on its external surface a cusped track 13 by means of which it can be rotated in indexed fashion so as bring a selected holding chamber into a position for launching any pig therein into the pipeline or for retrieving a pig from the pipeline into that holding chamber.

The ROV actuable controls 11, 12 in launch module enable the magazine to be rotated within the chamber so as to bring a selected storage compartment into a launching position and to supply fluid to that compartment so as to launch a pig (if present in that compartment) from that compartment into the pipeline or to retrieve a pig from the pipeline into that compartment.

The launch module 1 which comprises the bulk of the pig launcher and includes its ROV actuable controls includes a hanging eye 40. In use the launch module is lowered to the subsea location where it is landed and connected to a pipeline (by a ROV actuating said second actuable connector 4) at the commencement of pigging operations. The launch module remains so connected while a carrier module 2 (which is preferably of minimal size and complexity) conveys pigs between surface and subsea locations.

Pigs are loaded into the holding chambers of the magazine in the carrier module at the surface location; the carrier module is lowered to the subsea location, and docked with the launch module. To facilitate this, the carrier module includes a hanging eye 14 which enables it to hang from a lifting crane located at the surface location. The carrier module 2 is lowered to subsea location orientated under the effects of gravity so that a guide portion 16 of said frame 7 extends substantially horizontally. This arrangement allows the weight of the carrier module to be supported from the surface, while allowing the carrier module to be easily orientated by a ROV.

The launch module includes a guide arrangement 17 adapted to receive the guide portion 16 in docking fashion as the carrier module is moved substantially horizontally. The guide arrangement and guide portion together ensure that the blind hub 5 is approximately aligned for engagement with the first subsea connector 4 during docking. The ROV guides the carrier module (which is provided with a ROV grab handle 18) into position during docking with the launch module, and closes the first subsea connector by actuating its drive bucket 17 thus completing docking and loading operations. The two modules are then connected together in docking relationship as shown in FIG. 3.

The first subsea connector 4 preferably includes a guide funnel 19 (as best seen in FIG. 1) to further align the two modules during docking. The first subsea connector preferably employs a plurality of interconnected clamping segments and thus has a pull-in and precise alignment capability.

A ROV actuable control 11 allows ROV selection of a holding chamber and a ROV actuable control 12 allows pigs to be launched.

The launch module includes (as will be more fully described in below) a first ROV actuable mechanism 11 adapted to rotate the magazine in indexed fashion so as to bring a selected holding chamber into a launching position and a second ROV actuable mechanism 12 adapted to supply launching fluid into the selected chamber so as to launch a pig from that chamber into the pipeline 6 or to retrieve a pig from the pipeline into that chamber.

As shown in FIG. 4, the first ROY actuable mechanism 11 comprises a hydraulic ram 23 having a piston and rod 24 therein. The ROV can control a hydraulic ram 23 in well known manner causing it to expand and contract one or more times to stepwise rotate or 'index' the magazine to the next or any other bore. In this fashion it selects a pig to be launched or an empty chamber to receive a pig. Indexing of the magazine is achieved by a roller not shown) on the free end 25 of the ram shaft engaging in a cusped track 26 on the outside surface of the magazine.

As shown in FIG. 3 The second ROV actuable mechanism 12 consists of a kicker line which supplies fluid to and receives fluid from a selected holding chamber 10 in the magazine. The kicker line comprises two tube portions one in the launch module and one in the carrier module. As is shown in FIG. 3 the two tube portions are positioned to abut end to end at a point 27 when the two modules are docked together and the blind hub 8 has been engaged be the first subsea connector 4. The pig 28 shown (in FIG. 3) in a chamber 10 of the magazine can be selected by rotating the magazine 9 through 180® as described in the paragraph above.

The tube portion in the carrier passes through said magazine serving as an axel on which said magazine is able to rotate, passes through said blind hub substantially along its axis and returns as shown at 30 through said blind hub serving as a kicker tube for conveying launching to or releasing fluid from a selected chamber. Launching fluid flow is controlled by ROV control of at least one valve 28 in well-known manner. The pressure connection 28 for launching the pig comes in through the center of the magazine 9 and passes through the blind hub 8 and back in through the blind hub so as to exert pressure behind a selected pig to be launched. The connection can also be the pressure release when the unit is being used as a receiver.

A ROV can disconnect the launch module from the pipeline by actuating the second subsea connector so that the launch module can be recovered to the surface when required.

Thus the launch and carrier modules are adapted to allow a ROV to play an active role in landing, docking, loading, selecting, launching and launch module recovery operations.

As described above a pig launcher divided into at least two modules including a launch module and a carrier module. This is particularly advantageous in an environment in which pigs need to be conveyed between surface and subsea locations.

It should be readily apparent to one skilled in the art that more than one blind hub each with a magazine mounted on the front thereof could be mounted on the frame. In the use of an embodiment employing a plurality of hubs the carrier module could be positioned (e.g. with the aid of a ROY) such that one blind hub at a time is positioned for engagement by the subsea connector so that the pig or pigs supported in front of that blind hub is or are inserted into said chamber when that blind hub is engaged by the subsea connector. Also or alternatively a magazine could be adapted to hold a different number of pigs or be replaced by any arrangement adapted to support one or more pigs relative to the or each closure member so that the pig or pigs supported relative to a said closure member is or are inserted into said chamber when that closure is used to close said opening. The carrier module could comprise single blind hub rigidly mounted on the frame with an arrangement for holding a single pig in front of said blind hub. This would enable a carrier module to be of minimal size. This could be of particular benefit if a large pig is to be launched or launched and retrieved from a large diameter pipeline. It is conceivable that the launch module including a plurality of launch chambers each closed by a respective subsea connector could be employed. While it is unlikely that pigs of different diameters would be required to be launched into the same pipeline arrangement, a launch module including a launch chamber having an opening in the form of a large subsea connector through which an array of pigs of a given diameter can be inserted and a second smaller launch chamber having an opening in the form of a smaller subsea connector through which a single pig of the given diameter could be employed. This would allow multi-shot and single-shot carrier modules to be simultaneously employed.

A further embodiment could employ a disk rotatably mounted on a carrier module frame with more than one blind hub rigidly and/or rotatably mounted thereon. This would allow a ROV to engage and rotate the disk so as to bring a selected blind hub into position for engagement by a subsea connector forming the opening in a launch chamber. Rotatable blind hubs could have a magazine having a plurality of holding chambers rigidly mounted on their front face. This would allow such a blind hub to be rotated by a ROV so that an individual holding chamber can be brought into position for launching a pig therefrom prior to engagement of that hub by a subsea connector.

In the preferred embodiment a single blind hub is rigidly mounted on said frame and is engageable by a single subsea connector in the launch module, a multi-chamber magazine having a plurality of chambers each adapted to hold a pipeline pig is rotatably mounted on the front/inner face of the blind hub and the pig launcher includes mechanisms controllable from the launch module to rotate the magazine so as to bring a selected chamber into a launching position and to supply launching fluid into the selected chamber so as to launch a pig therefrom into a pipeline.

Thus an undersea pig launcher in accordance with the present invention is divided into two separate but interconnectable modules, including a launching module which can be installed and remain at an undersea location, while a carrier module conveys pigs between surface and undersea locations. This substantially reduces the size of the carrier module i.e. the equipment carried backwards and forwards during pig loading and/or unloading operations. An undersea pig launcher in accordance with the present invention further includes including ROV controllable arrangements for connecting said two modules together, selecting a said chamber and launching said pig therefrom. This allows a ROV to play a more active role in operations.

In the preferred embodiment as much of the pig launcher as reasonably practical is located within the launch module, making said carrier module as compact as practical. The pig launcher is preferably an all metal construction.

Preferred forms of the system employ as the first and second subsea connectors a clamp connector include a plurality of interconnected clamping segments to provide a pull in function between the assembly and the arrangement, a guide funnel for mid-range alignment and a pair of mating hubs for fine alignment. A clamp connector suitable for use as the first subsea connector and as the second subsea connector is described below with reference to FIG. 5.

Preferably said blind hub 8 is a female hub (as shown in FIG. 3) and is adapted to mate with a male hub held captive by said clamp connector so as to provide a fine alignment function. The male hub functions as the launch chamber 3. A pressure energised metal seal ring 35 of well-known type such as one sold under the Registered Trademark "DUO-SEAL" is located between the hubs. It is fitted in a recess in the inner edge of the male hub.

Figure 5:
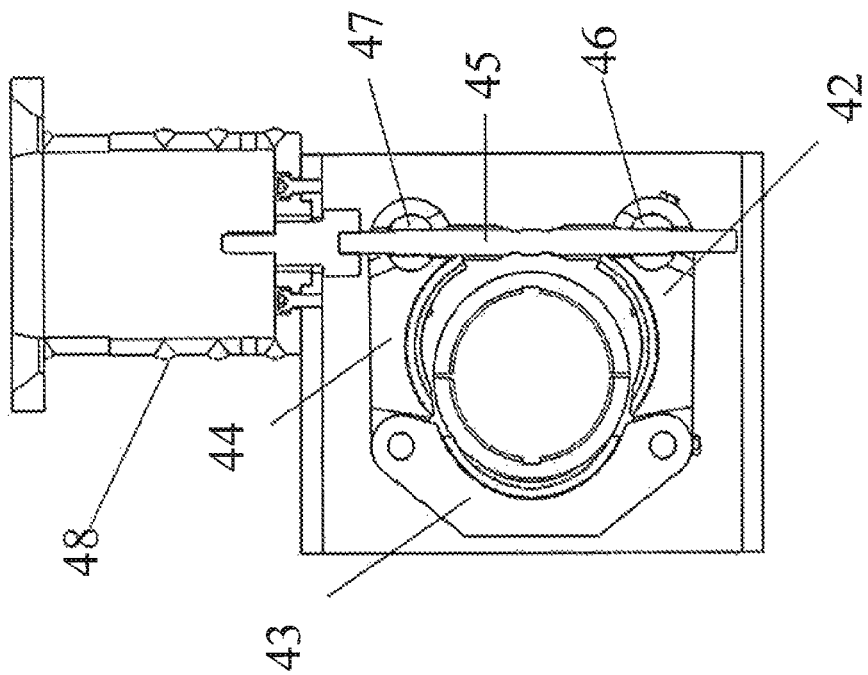
FIG. 5 shows a cross sectional view through a known subsea connector used in the exemplary embodiment.

FIG. 5, shows a known clamp connector suitable for use in the present invention and which are sold for subsea use under the Registered Trademark OPTIMA. These connects include typically three pivotally interconnected segments 42, 43 and 44 linked to fit round and pull together a pair of mating male and female hubs and have pull in and alignment capabilities. As shown the free ends of segments 42 and 44 are linked to a leadscrew 45 via collets 46, 47. When the leadscrew is turned by ROY rotation of a drive bucket 48 the hubs are pulled in well-known manner into sealing engagement with each other via the intermediary of a seal ring.

The invention claimed is:

1. A pig launcher divided into two separable modules comprising a launch module and a carrier module; said launch module including at least one launch chamber having an opening through which at least one pig can be loaded into that launch chamber and a coupling arrangement arranged for coupling said launch module to a pipeline so that pigs can be launched from a said launch chamber into said pipeline; said carrier module including at least one closure member having attached thereto a corresponding housing adapted to house at least one pig, the or each said housing being positioned relative to its closure member so that, when an opening in a said launch chamber is closed by a said closure member, the corresponding said housing becomes located within that said launch chamber thus loading any pigs housed in that housing into that launch chamber.

2. A pig launcher as claimed in claim 1 and in which said carrier module includes a frame, said opening is a subsea connector, and said closure member is a blind hub mounted on said frame and engageable by said subsea connector.

3. A pig launcher as claimed in claim 2 and in which said housing is a cylindrical magazine having a plurality of holding chambers therein each adapted to hold a single pipeline pig, said magazine is rotatably mounted on the front/inner face of said blind hub and; said launch module includes ROV actuable mechanisms to rotate the magazine in indexed fashion so as to bring a selected said holding chamber into a launching position and to supply launching fluid into the said selected holding chamber so as to launch a pig therefrom into a pipeline.

4. A pig launcher as claimed in claim 2 and in which said carrier module is adapted to hang underwater orientated under the effects of gravity so that a guide portion of said frame extends substantially horizontally and said launch module includes a guide arrangement adapted to receive said guide portion in docking fashion as said carrier module is moved substantially horizontally so that said blind hub is approximately aligned for engagement with said subsea connector.

5. A pig launcher as claimed in claim 2 and in which said subsea connector includes a guide funnel.

6. A pig launcher as claimed in claim 2 and in which the launch module includes a second subsea connector arranged to connect said launch module to said pipeline.

7. A subsea pigging system for launching pigs into a subsea oil or gas production pipeline in a diverless operation, said system including a pig launcher as claimed in claim 1.

* * * * *